UNITED STATES PATENT OFFICE.

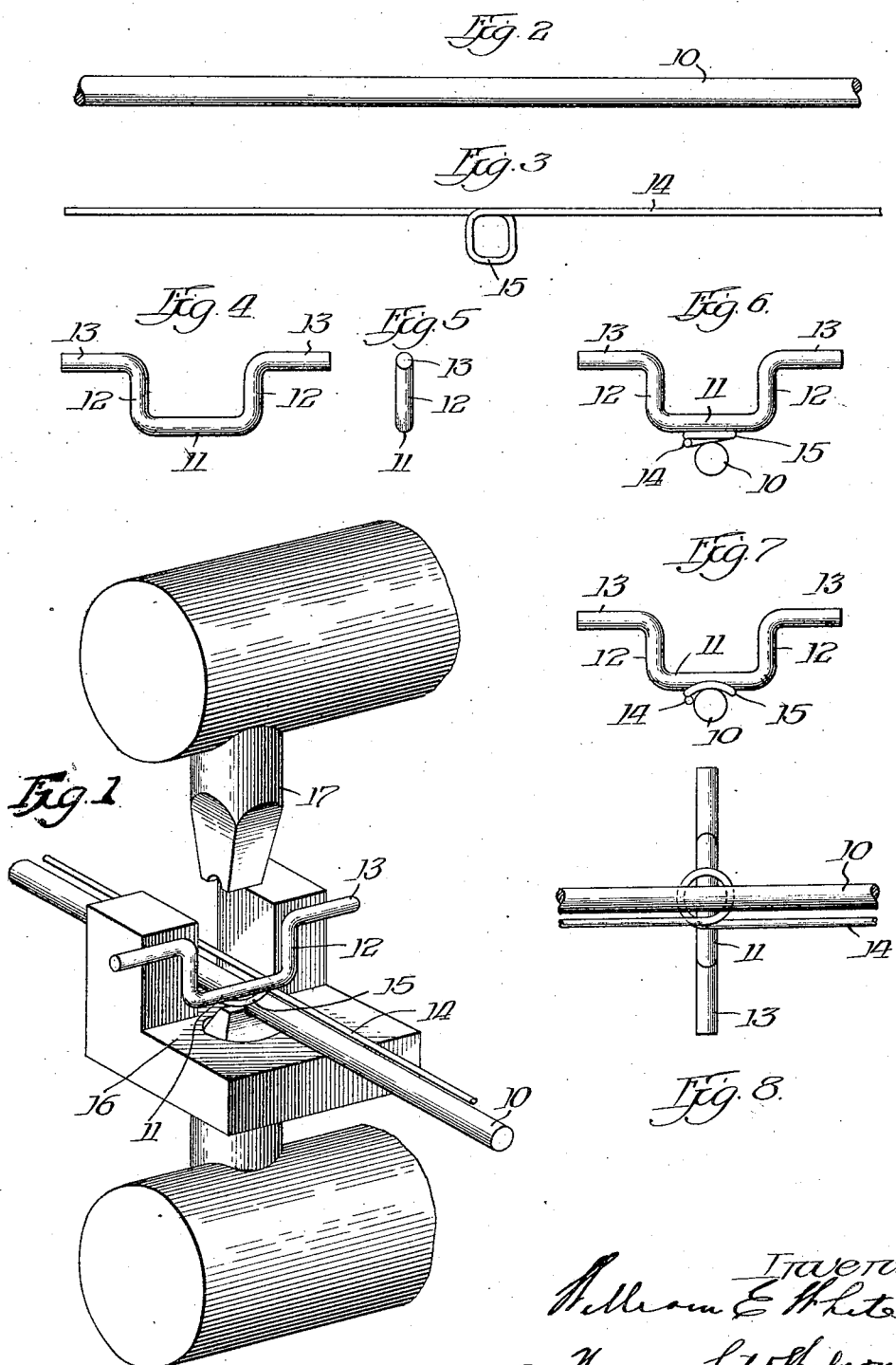

WILLIAM E. WHITE, OF CHICAGO, ILLINOIS.

METHOD OF MAKING SPACING DEVICES FOR REENFORCING BARS.

1,415,285.

Specification of Letters Patent. Patented May 9, 1922.

Application filed June 25, 1920. Serial No. 391,776.

*To all whom it may concern:*

Be it known that I, WILLIAM E. WHITE, a citizen of the United States, and resident of Chicago, in the county of Cook and State of Illinois, have invented certain new and useful Improvements in a Method of Making Spacing Devices for Reenforcing Bars, of which the following is a specification.

My invention relates to the art of concrete reenforcement and particularly to a novel method of manufacturing a spacing device for use in connection therewith.

In the use of reenforcing bars it is desirable and necessary to provide means for suitably spacing such bars from each other, and from the forms within which the concrete is moulded. This result is secured by providing devices in the nature of light weight spacing wires having legs or chairs secured thereto, the bars being laid upon the chairs.

In this connection it is desirable to provide means for easily and firmly fastening the bars to the spacers in proper position. One satisfactory means for so fastening the bars consists of a length of readily bendable wire attached to the spacer at a point of bar location, attachment being made midway in the length of the readily bendable wire, commonly called the tie wire, so that two free ends are provided to be bent upward and around a bar in opposite directions, so encircling the bar, meeting on top of the bar, and adapted to be tightly joined by twisting with pliers, or otherwise securely locked together.

My invention relates particularly to a method of attaching such tie wires to a spacing device in which spacing and bar supporting elements are joined together by an electric welding process. In the manufacture of a spacing device of this type, it is essential that the tie wires be provided in correct association with the spacing and rod supporting elements, and it is very desirable that assembly of these elements be done in a single operation through the use of electric welding apparatus. Under the present state of the electric welding art, it is not practical to weld the tie wire directly to either the spacing member or bar support, because the tie wire is of small size in relation to the wire spacing member or bar supporting legs and receives such intense heat during the welding process that its texture at point of weld becomes fundamentally changed, and the wire becomes exceedingly brittle and liable to breakage in subsequent bending. It is therefore necessary to devise a method whereby the desired association of the three members can be accomplished at a single welding operation without damage to the tie wire element through welding. To this purpose, I have applied myself and have devised a novel method which consists of first forming the tie wire element with a loop or eye at its middle portion, then assembling the spacer element, tie wire element and chair element in a die associated with the electrodes of the welding apparatus, so that when the weld is made, the chair and spacer elements come in direct contact within the eye or loop of the tie wire element, which is not welded itself, but is rigidly held in correct position in readiness for bending according to its prescribed use.

The invention will be more readily understood by reference to the accompanying drawings, wherein, Fig. 1 is a perspective view showing a portion of an electric welding machine and die in which the welding operation is carried out;

Figs. 2 and 3 show respectively the spacing wire and the tie wire, these views being furnished in order to illustrate the relative sizes of the two wires;

Figs. 4 and 5 are side and end views respectively of the wire chair employed;

Fig. 6 is a view showing the spacing wire in end elevation and the chair in side elevation, the parts being in the position assumed before the welding operation takes place;

Fig. 7 is a similar view showing the position after the welding operation, and,

Fig. 8 is a plan view of the completed structure as shown in Fig. 7.

In the drawings it will be seen that in carrying out the method of my invention I provide a longitudinal spacing wire 10, of desired size and stiffness. With this I associate a chair member composed of a horizontal member 11, legs 12, and feet 13. In Figs. 1 and 4 to 7 inclusive, the chair is shown in inverted position it being understood that in practice the feet 13, rest upon the wooden mold or form for the concrete, the spacing wire being located on top of the horizontal member 11. The chair members are rapidly formed in an automatic machine and are secured to the spacing wire as hereafter described. The tie wire 14 is bent to provide a loop or eye 15, intermediate its ends, as best shown in Fig. 3, the eye being of such size as to secure the desired result, as illustrated in Figs. 6, 7 and 8. As shown in those figures, the tie wire is secured in position by placing the looped portion thereof between the chair and the spacing wire, then applying pressure to force the said members into contact and to weld them in that position. As shown in Fig. 6, the loop or eye is in a plane with the ends of the tire wires and thus when laid on a spacing wire the chair is spaced away from the spacing wire a distance equal to twice the diameter of the tie wires. In order to bring the chair and spacing wire into contact it is necessary to distort the loop in the tie wire by bending the sides of the loop.

The eye or loop rests on the spacer member with its long sides at right angles to the long axis of the spacer member. When the chair is placed in the die 16, it rests on the short end portions of the eye or loop and is, as stated, prevented from contacting with the spacer member.

When pressure is applied on upper electrode 17, the chair is forced down into contact with the spacer member, this contact taking place between the long sides of the eye or loop in the tire wire. In this action the short ends of the loop, already in contact with the chair, have been forced down with the chair and in this movement the long sides of the loop are bent to curved form, contacts being sustained first between the upper surface of the spacing member and lower surface of the loop, and second, between the upper surface of the loop and lower surface of the chair. Two contacts of each sort develop sufficient binding action, so that on completion of the weld the loop is held in place with practical rigidity and cannot be displaced without considerable movement of the free ends of the tie wire.

In the completed product, as shown in Fig. 8, the free ends of the tie wire lie alongside of the spacing wire and may readily be bent up and around a reinforcing bar placed on the chair at its intersection with the spacing wire. Inasmuch as the tire wire is by the bending action placed under a certain degree of tension it will remain firmly held in the position shown although it is not mechanically secured to the parts except to the extent indicated.

I claim:

1. The method of making spacing devices, which consists in bending a tie wire to provide an eye therein, then forming a chair member, then placing the chair and a spacing element in a die with the eye of the tire wire interposed between the chair and spacing element, and then applying pressure as an incident to an electric welding operation by which the chair and spacer are joined at a point within the said eye, substantially as described.

2. The method of making spacing devices, which consists in bending a tie wire to provide an eye therein, then forming a chair member, then placing the chair and a spacing element in a die with the eye of the tire wire interposed between the chair and spacing element, and then applying pressure as an incident to an electric welding operation by which the chair and spacer are joined at a point within the said eye, the pressure exerted serving to distort the material composing the tire wire and causing the tie wire to be firmly locked in position, substantially as described.

3. In a method of making spacing devices, which consists in forming a generally U-shaped chair, then bending a tie wire to provide an eye therein, then holding a spacing member within a die and placing the loop of the tire wire on the spacing member, then placing the base member of the U-shaped chair in the die against the loop of the tie wire, then applying pressure to force the chair and spacing member into contact for electric welding purposes, the sides of the eye in the tire wire being bent in the process of forcing the chair and spacing member into contact, substantially as described.

Signed at Chicago, Illinois, this 19th day of June, 1920.

WILLIAM E. WHITE.